April 18, 1950     A. WEISSBACH     2,504,237

RACK FOR ROASTING FOWL

Filed Aug. 17, 1948

INVENTOR.
Anna Weissbach
BY Benj. T. Rauber
ATTORNEY

Patented Apr. 18, 1950

2,504,237

UNITED STATES PATENT OFFICE 2,504,237

RACK FOR ROASTING FOWL

Anna Weissbach, Upper Montclair, N. J.

Application August 17, 1948, Serial No. 44,600

2 Claims. (Cl. 99—426)

My invention relates to a device for roasting fowl, such as turkey and chicken and capon.

Heretofore in roasting fowl of the above type the carcass was placed on its back in the roasting pan, the breast and legs projecting upwardly. Consequently the fat and juices, which are predominantly in the back, remained in the bottom of the roasting pan about the back, while the breast, which is generally relatively drier and less juicy, was subjected to a dry heat and any juices that were present in, or placed on, the breast tended to flow downwardly from the breast. The breast, therefore, tended to dryness, shrinking and toughness.

My present invention provides a device to hold the fowl with its breast and legs downwardly in the roasting pan and to retain a sufficient amount of the juices in contact with the breast to avoid drying it and to keep it tender.

In my invention I provide a holding device having sides conforming to the shape of the breast of the fowl, that is, of an approximately V-shape. The sides are joined at their ends to strengthen them and to retain the juices to a suitable depth about the breast of the fowl. The device is held in upright position by a frame having supporting feet to rest on the roasting pan and engaging elements to support the sides. This frame may be detached for cleaning.

The various features of the invention are illustrated, by way of example, in the accompanying drawings in which Fig. 1 is a plan view of the device;

Figure 4:
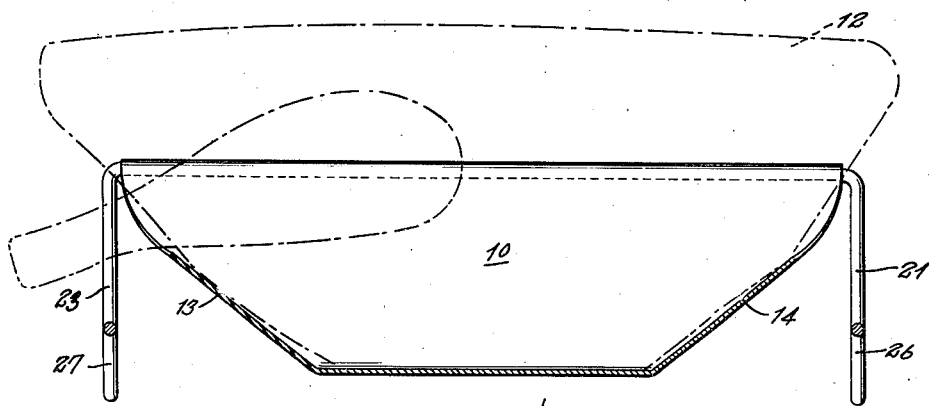
Fig. 4 is a longitudinal section, taken on line 4—4 of Fig. 1, showing the position of the fowl to be roasted.

Referring to the accompanying drawings, the device of my invention comprises a pair of side walls 10 and 11 of suitable sheet metal flaring upwardly and outwardly to form a trough to receive the breast portion of a fowl 12, as indicated in Fig. 4, and support it in upright position. At its opposite ends the trough is partly closed by end walls 13 and 14 extending from one side wall to the other and inclined upwardly and outwardly. The upper edges of the end walls slope downwardly to form a notch as at 15 and 16 to fix the level of juices retained in the trough and to permit the fowl to project beyond the ends of the trough as shown in Fig. 4.

Figure 1:
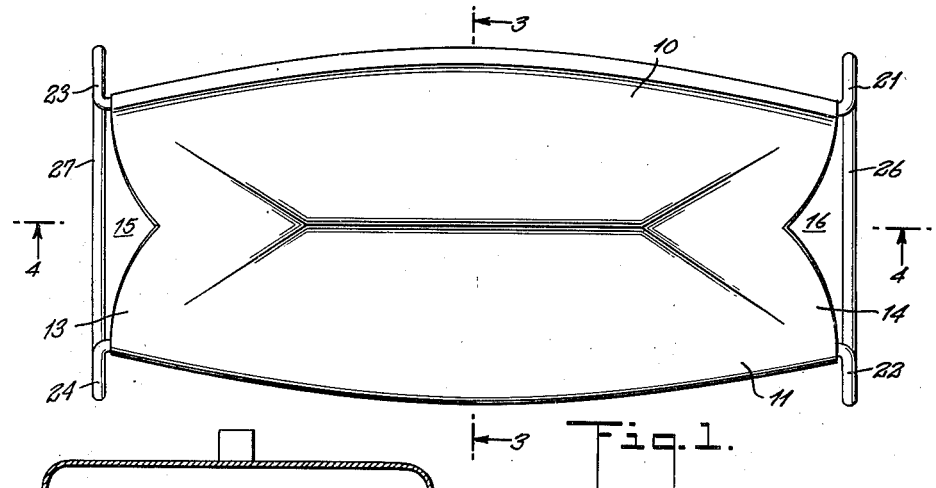
Figure 2:
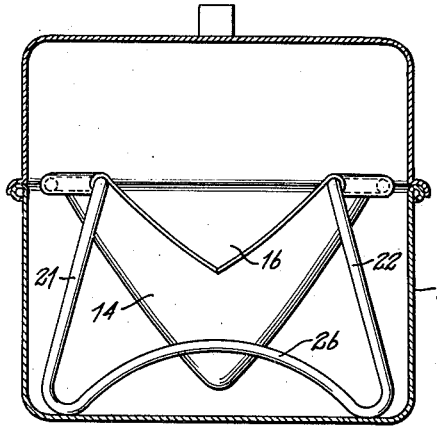
Fig. 2 is an end view of the device in a roasting pan.
Figure 3:
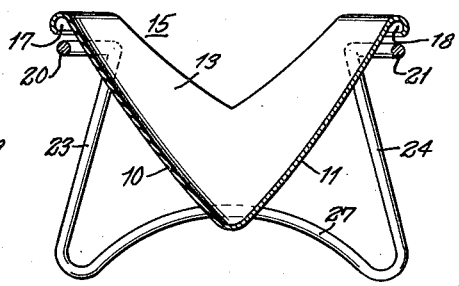
Fig. 3 is a vertical section taken on line 3—3 of Fig. 1.

The side walls 10 and 11 are bulged or rounded outwardly toward their upper edges as shown in Fig. 1 to fit the shape of the fowl. The upper edges of the side walls are turned downwardly to form recesses 17 and 18 to receive arms of a supporting frame by which the trough is supported in a roasting pan 19 as shown in Fig. 2.

The supporting frame preferably comprises a pair of arms 20 and 21 shaped to conform to and fit into the recesses 17 and 18 and project beyond the ends thereof. The projecting ends of the arms 20 and 21 bend downwardly and outwardly to form legs 22, 23, 24 and 25 extending below the bottom of the trough. The lower ends of the legs at opposite ends of the trough are joined by connecting lengths 26 and 27 arched upwardly to clear the supporting surface of the roasting pan. The frame may be made of a continuous wire of suitable stiffness. It may be removed from the trough for cleaning.

During the roasting of a fowl in the position indicated in Fig. 4, the juices drain downwardly into contact with the breast keeping it moist. A small amount of the juices are retained in the bottom of the trough in contact with the lower part of the breast insuring against drying of the breast. The breast will brown without becoming hard and dry.

What I claim is:

1. A device for roasting fowl which comprises a trough having sheet metal side walls extending upwardly and outwardly from a median line to receive the breast portion of a fowl and turned downwardly at their upper edges to form downwardly opening recesses and having end walls flaring outwardly and upwardly and notched downwardly at their upper edges and a supporting frame fitting said downwardly opening recesses to support said trough.

2. A device for roasting fowl which comprises a trough having side walls extending upwardly and outwardly to receive the breast portion of a fowl and turned downwardly at their upper edges to form downwardly opening recesses and having end walls flaring outwardly and upwardly and notched downwardly at their upper edges and a supporting frame to support said trough and comprising a pair of arms in said downwardly opening recesses, legs extending downwardly from said arms and cross pieces joining the lower parts of the legs at opposite ends of said trough.

ANNA WEISSBACH.

REFERENCES CITED

The following references are of record in the file of this patent:

UNITED STATES PATENTS

| Number | Name | Date |
|---|---|---|
| 123,012 | Goss | Jan. 23, 1872 |
| 849,290 | Vanderbilt | Apr. 2, 1907 |
| 1,198,238 | Klien et al. | Sept. 12, 1916 |
| 1,630,471 | Collins | May 31, 1927 |
| 1,745,784 | Davis | Feb. 4, 1930 |
| 1,837,535 | Duffey et al. | Dec. 22, 1931 |
| 2,222,089 | Soffell | Nov. 19, 1940 |
| 2,376,640 | Wall et al. | May 22, 1945 |

FOREIGN PATENTS

| Number | Country | Date |
|---|---|---|
| 520,135 | Great Britain | Apr. 16, 1940 |